United States Patent [19]

Fujisaki et al.

[11] Patent Number: 4,626,752
[45] Date of Patent: Dec. 2, 1986

[54] ELECTRIC MOTOR HAVING HALL GENERATORS AND CONTROL CIRCUIT

[76] Inventors: Kiyonori Fujisaki, 195-4 Ooyaguchi, Matsudo-shi, Chiba-ken; Toshio Kobayashi, 6-1-13 Kitakarasuyama, Setagaya-ku, Tokyo; Heihachi Kato, 232 Terao, Kawagoe-shi, Saitama-ken, all of Japan

[21] Appl. No.: 751,281

[22] Filed: Jul. 2, 1985

[30] Foreign Application Priority Data

Mar. 4, 1985 [JP] Japan .................................. 60-42965
Mar. 4, 1985 [JP] Japan .................................. 60-42966

[51] Int. Cl.$^4$ ............................................ H02K 29/08
[52] U.S. Cl. .................................... 318/254; 318/138; 318/439; 310/68 R
[58] Field of Search ............... 318/138, 254 A, 254, 318/439; 310/67 R, 68 R, 112, 114, 156

[56] References Cited

U.S. PATENT DOCUMENTS 3,501,655  3/1970  Siefert ............................ 318/254 X
3,693,034  9/1972  Inariba ............................ 310/112 X
4,355,249 10/1982  Kenwell ....................... 310/67 R X

FOREIGN PATENT DOCUMENTS 2820308 11/1979  Fed. Rep. of Germany ...... 310/112
55-120364  9/1980  Japan ................................ 318/254
56-62060   5/1981  Japan ................................ 318/254

Primary Examiner—William M. Shoop, Jr.
Assistant Examiner—Bentsu Ro
Attorney, Agent, or Firm—Ziems, Walter & Shannon

[57] ABSTRACT

An electric motor has in combination a rotor having two permanent magnets of different polarities, two Hall generators responsive to the magnetic fluxes generated from the respective permanent magnets to produce different electric signals, two comparator circuits each arranged in combination with each of the Hall generators and operated in response to the resultant outputs, a logic circuit operated in response to the outputs of the comparators to produce the resultant outputs and a 3-phase inverter circuit having first, second and third stages each having two inputs and one output, the inputs of the first stage being connected to the outputs of one of the comparator circuits, the inputs of the second stage being connected to the outputs of the other of the comparator circuits and the inputs of the third stage being connected to the outputs of the logic circuit, the first, second and third stages having the outputs connected respectively to the delta connection points of coils wound around the electrodes of armature assembly. Further the electric motor has a pair of armatures and a pair of cylindrical rotors having a rotating shaft, the armatures being arranged side by side axially of the rotating shaft and electrically connected to each other, the cylindrical rotors each arranged as enclosing each of the armatures and being pressed against each other at one end thereof and having the one end secured to the rotating shaft.

10 Claims, 8 Drawing Figures

4,626,752

ELECTRIC MOTOR HAVING HALL GENERATORS AND CONTROL CIRCUIT

BACKGROUND OF THE INVENTION

The invention relates to an electric motor and more particularly relates to a 3-phase Hall motor having two Hall generators used in combination with a control circuit including comparator circuits, a logic circuit and a three-phase inverter circuit which are sequentially operated in response to an output from the Hall generators to control the rotation of the motor. Moreover the electric motor has a pair of armatures and a pair of cylindrical rotors each of which is rotated around each of the armatures, the cylindrical rotors being pressed against each other at one end thereof and having the one end secured to a rotating shaft to maintain the mechanical balance of the rotors and to increase the balance of magnetic force acting between the armatures and the rotors to thereby rotate the motor at a high speed with reduction of vibrations. Further the armatures have a predetermined number of electrodes, the electrodes of one armature being arranged as angularly displaced from those of the other armature to smooth the rotation of the motor.

The Hall motor is generally simple in mechanism, free from mechanical and electric noises, unabrasive except for the bearings, and is therefore durable, reliable, requires no maintainance work and is adapted to rotate at a high speed. With so many features being provided, the Hall motor of the invention may be widely used in the appliances such as audio devices, disk memory drives, facsimile scanners, etc.

So far Hall motors have been generally expensive because this type of motor requires extremely complicated control circuits including Hall generators which are of a high cost. Recently the Hall generators have been supplied in a mass production with the progress of semiconductor processing techniques and may be easily available for use in motors, but none the less the Hall generators are more expensive than the linear IC.

For example, in the conventional Hall motor of 3-phase and bipolar type which corresponds in energy conversion efficiency to the 3-phase motor having brushes, the rotor has a driving permanent magnet and a position detecting magnet secured thereto with the polarities N and S being separately provided, and the three Hall generators are arranged with an angular space 120° being provided therebetween for detecting only one direction of magnetic flux of polarity N or S so as to produce each positional signal to thereby operate transistors for supplying the electric current to the coils of motor through a number of gate circuits. Such a Hall motor is costly because the magnetization of rotor is complicated, three Hall generators are required and especially because specific integrated circuits are required to provide so many gate circuits.

With the foregoing reasons, many Hall motors have been of 2-phase type with two Hall generators together with comparatively simple control circuits being provided. Such a 2-phase Hall motor however cannot avoid dead points in principle and often stops if the motor has a frictional load. Moreover when the torque is small, the counter electromotive force is small and the copper loss is considerably large and accordingly the efficiency is extremely low. Further the starting torque is small. Therefore the 2-phase Hall motor has been used especially in combination with appliances such as fans which will not require a big starting torque, instead of appliances such as toys, cassette tape recorders, etc., which require a big starting torque. The brush type motors have been used for these appliances requiring a big starting torque. However it is generally known that the brush type motors produce electric noise, and the brushes and commutators are easily abrasive and accordingly are of poor durability.

Further the conventional Hall motors have an armature secured to the motor case and a cylindrical rotor secured to the rotating shaft and rotatable around the armature. More precisely the cylindrical rotor has one end secured to the rotating shaft. It is therefore very difficult to obtain the mechanical balance of the rotor and the balance of magnetic force acting between the armature and the permanent magnets of the rotor. Accordingly it is almost impossible to drive such a motor at a high speed, for example, at the speed of about 10,000 r.p.m. Further the considerable mechanical noise and vibration are unavoidable. These defects become more and more remarkable in case the armature is thickened in the axial direction of the rotating shaft, and the cylindrical rotor is accordingly lengthened in the same direction in order to increase the output of the motor.

OBJECTS AND SUMMARY OF THE INVENTION:

The invention has been provided to eliminate the defects and disadvantages of the prior art. It is therefore an object of the invention to provide an electric motor in which the rotor is magnetized with a pair of rotor driving magnets in a manner that the N and S polarities are extended opposite to each other in the angular region of 120° or a little more of the rotor, and to use the driving magnets to detect the angular positions of the rotor, so that a pair of Hall generators may detect the conditions of the rotor each time the latter produces the magnetic flux of N polarity and of S polarity and produces no magnetic flux. It is another object of the invention to use the Hall generators in combination with a simply designed control circuit including a logic circuit so as to drive the Hall motor with a lower cost but with a high torque corresponding to that of the DC electric motor of brush type. It is another object of the invention to provide a high torque Hall motor of lower cost which is highly reliable and durable and which may be used, instead of the conventional brushtype motor, in various appliances, to thereby reduce the working process and cost required to maintain and change such appliances.

In short, the invention comprises armature means providing a plurality of projected poles having coils wound therearound respectively; rotor means having an axially extended rotating shaft and having at least a pair of permanent magnets secured thereto, the permanent magnets presenting N polarity and S polarity respectively each producing a magnetic flux of the specific polarity, said rotor means having portions producing no magnetic flux; Hall generator means operated in response to the magnet fluxes generated from said permanent magnets to produce different electric signals in dependence upon the angular positions of the rotor means; and control circuit means operated in response to the electric signals of the Hall generator means to control electric current flowing through the coils of the armature means, the control circuit means including comparator means operated in response to the electric signals of the Hall generator means to produce different outputs, logic circuit means operated in response to the outputs from the comparator means to produce the resultant outputs and inverter circuit means operated in response to the outputs from the comparator means and from the logic circuit means to control the electric current flowing through the coils of the armature means.

It is still another object of the invention to provide an electric motor having a pair of cylindrical rotors and a pair of armatures arranged axially of a rotating shaft, the cylindrical rotors each enclosing each of the armatures and having a bottom at one end and being opened at the opposite end, the cylindrical rotors having the bottoms pressed against each other and fixedly connected and having the bottoms secured to the rotating shaft so as to increase the mechanical balance of the rotors and the balance of magnetic force acting between the armatures and the permanent magnets of the rotors to thereby reduce the mechanical and electric noises and vibrations of the motor. It is another object of the invention to increase the thickness of the rotors to further increase the output of the motor and also to increase the rotation speed of the motor, for example, up to 10,000 r.p.m without noises and vibrations. It is another object of the invention to provide three projected poles on each of the armatures and to arrange the armatures on both sides of the connected walls of the cylindrical rotors in such a manner that the poles of one armature are displaced by about 60° from those of the other armature in the rotational direction of the rotors, so that the 3-phase electric motor may substantially have a rotational property such as of the 6-phase electric motor. It is still another object of the invention to angularly displace the poles of one armature to those of the other armature to thereby properly change the times when these armatures pass by the electric positions, thus to prevent the abrupt change of torque and to moderate the resultant shock, so that the motor may smoothly rotate. It is still another object of the invention to angularly displace the poles of one armature to those of the other armature to obtain the same rotational property such as to be actually obtained when the center angles of the poles are enlarged while maintaining the condition in which the coils may be easily wound around the projected poles of the armatures as usual.

In short, the invention comprises armature means providing a plurality of projected poles having coils wound therearound respectively; rotor means having an axially extended rotating shaft and having permanent magnet means secured thereto; Hall generator means for detecting the angular positions of said rotor means and producing an electromotive force in cooperation with said magnet means; control circuit means operated in response to said electromotive force produced by the Hall generator means to control the electric current flowing through the coils of said armature means; said armature means being composed of a pair of armatures arranged axially of said rotating shaft and electrically connected to each other, said rotor means being composed of a pair of cylindrical rotors each having a bottom at one end and being opened at the opposite end, each of said cylindrical rotors enclosing each of said armatures and having said bottom fixedly connected to said bottom of the other cylindrical rotor and to said rotating shaft.

The other features and advantages of the invention will be apparent from the following descriptions of a preferred embodiment in reference to the attached drawings.

DETAILED DESCRIPTION OF THE INVENTION

Figure 1:
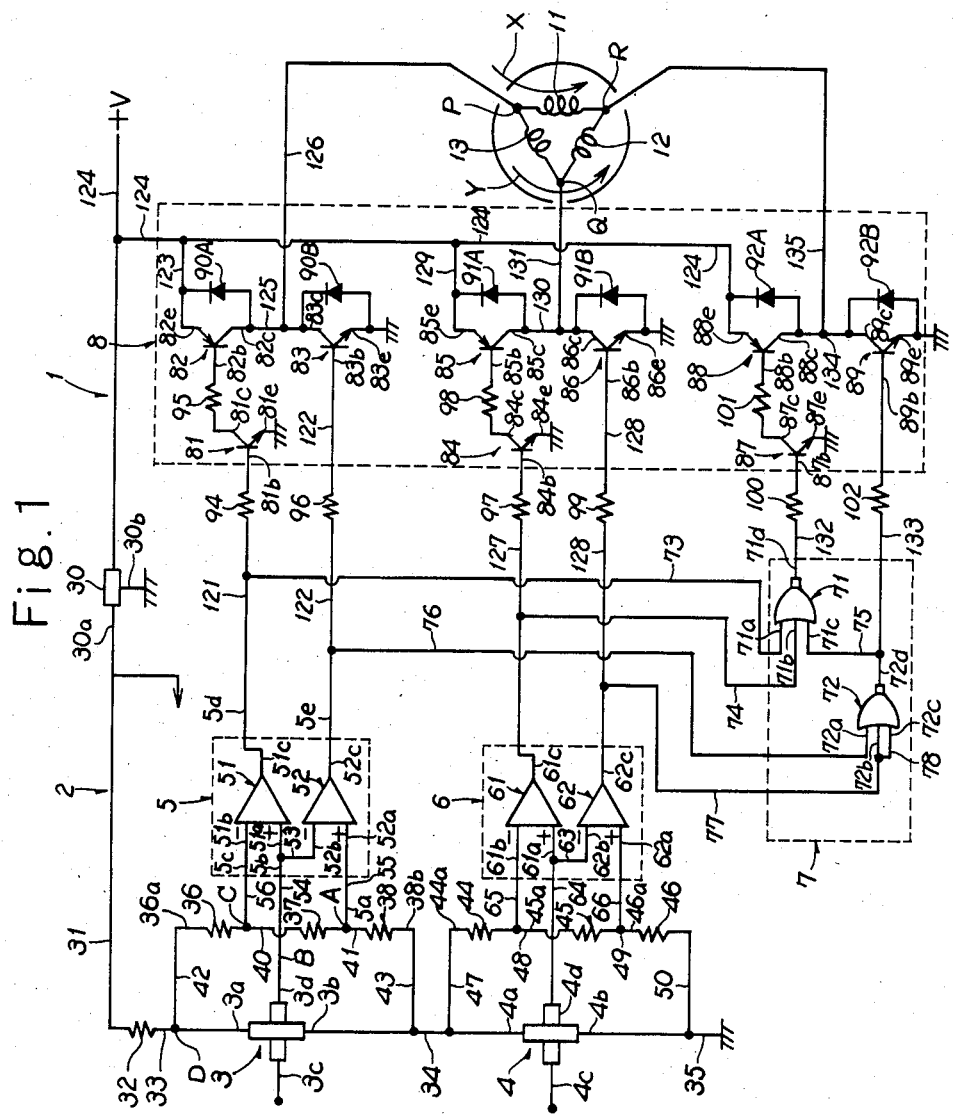
FIG. 1 is an electric circuit diagram for controlling an electric motor of the invention.

In reference to FIGS. 1 to 5, a Hall motor 1 is provided with an electric control circuit 2 in which are employed Hall generators 3, 4, voltage comparator circuits 5, 6, a logic circuit 7 and a 3-phase inverter circuit 8. Further the Hall motor 1 is provided with a pair of armatures 10 each having projected poles 10a, 10b, 10c each radially extended and terminated in a circumferential extension. The armature poles 10a, 10b, 10c have coils 11, 12, 13 wound therearound respectively. The Hall motor 1 is further provided with a predetermined number of permanent magnets 14, 15, a rotor assembly 16, a rotating shaft 18 and a motor case 21.

Figure 2:
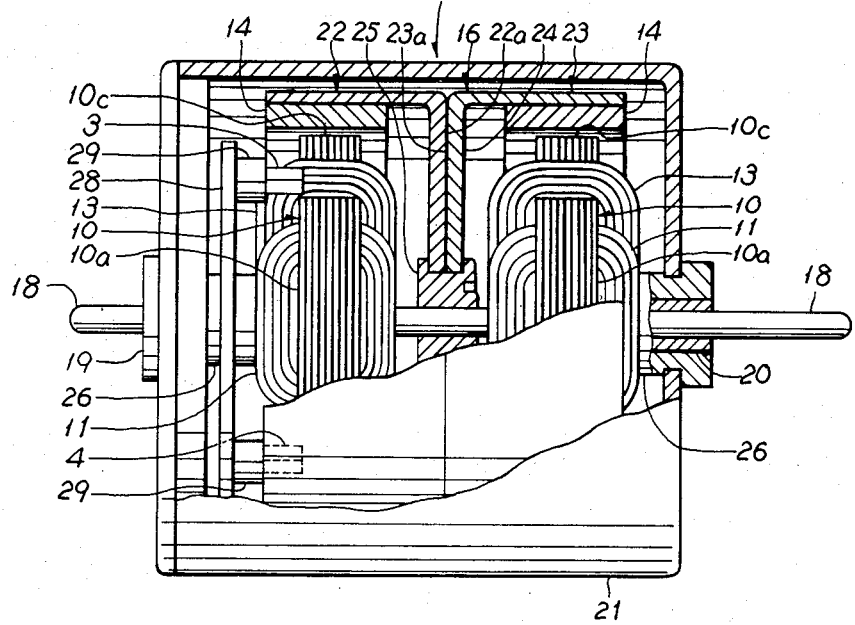
FIG. 2 is a side elevational view of the electric motor shown partly in vertical section.
Figure 5:
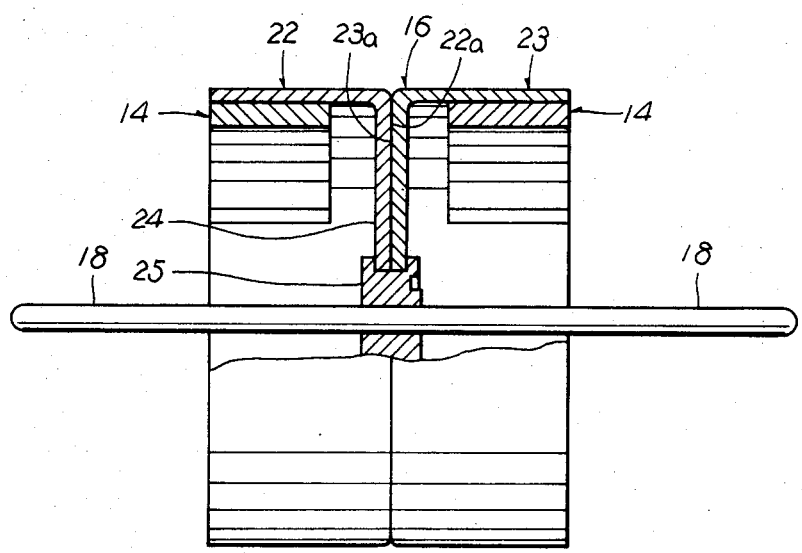
FIG. 5 is a side elevational view of a set of rotors shown partly in vertical section.

The rotor assembly 16 is composed of a pair of cylindrical rotors 22, 23 having vertical walls 22a, 23a respectively which are brought into contact with each other in alignment on the outside thereof and welded together to form an elongated cylindrical rotor assembly 16 having a united vertical wall 24. The united vertical wall 24 has a boss 25 fixedly attached to the center thereof, which is in turn secured to the rotating shaft 18. Each of the rotors 22, 23 has a pair of permanent magnets 14, 15, which are semicircular in vertical section, attached to the inner side of the cylindrical wall thereof opposite to each other. Namely as particularly shown in FIG. 4, the rotor assembly 16 has two sets of permanent magnets 14, 15 of respective polarities N, S attached to the inner side thereof opposite to each other, each extending over a predetermined angular region $\phi$ about 120° in such a manner that the rotor assembly 16 has a pair of predetermined angular regions 16a about 60° left unmagnetized opposite to each other. Thus the rotor assembly 16 is structured to have the predetermined angular portions $\phi$ producing a magnetic flux and the predetermined angular portions 16a producing no magnetic flux. As shown in FIGS. 2 and 5, the rotor assembly 16, composed of two rotors 22, 23, is opened axially in opposite directions and so arranged as to rotate around the pair of armatures 10 with a mechanically balanced condition with respect to the rotating shaft and accordingly with the balance of magnetic force being maintained.

Figure 3:
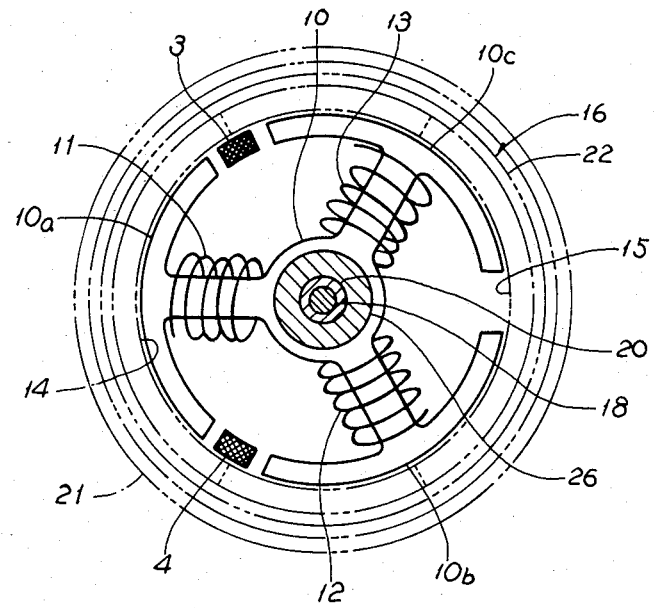
FIG. 3 is a front elevational view of the electric motor showing a positional relation between an armature, Hall generators and a rotor.
Figure 4:
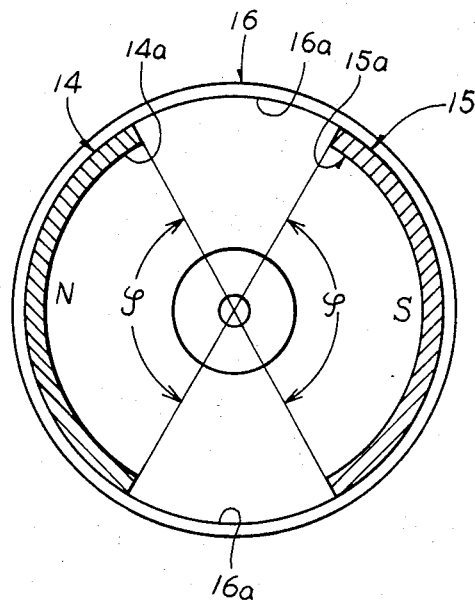
FIG. 4 is a front elevational view showing the rotor of the electric motor.

Further the coils 11, 12, 13 of the two armatures 10 are connected to each other to make a single armature assembly of the individual armatures 10. The rotating shaft 18 is rotatably journalled by a pair of bearings 19, 20 of the motor case 21. The armatures 10 are each secured to the motor case 21 by means of support members 26. The Hall generators 3, 4 are carried by a pair of carrier members 29 secured to a bracket 28 which is in turn secured to a support member 26, and are arranged respectively between the pole 10a and the pole 10b, and between the pole 10a and the pole 10c of one of the armatures 10. As shown in FIGS. 2 and 3, the armatures 10, 10 are provided with the radially extended three poles 10a, 10b, 10c respectively and are located on both sides of the connected walls 22a, 23a of the rotors 22, 23 in a manner that the poles 10a, 10b, 10c of one armature are angularly just opposite to the poles of the other armature respectively in the individually same phase positions. These poles 10a, 10b, 10c of both armatures 10, 10 may however be arranged as being displaced by 60° from each other so as to substantially obtain the effect of a 6-pole electric motor. Further the poles 10a, 10b, 10c of both armatures 10, 10 may be angularly displaced by 10°, 20° or 30° from each other so that each space between the poles may be occupied by each pole. Thus a specific property may be obtained such as to be actually obtained in case the center angles between the poles 10a, 10b, 10c have been enlarged or a single armature has been twisted in the rotational direction of the motor. Even in this case, since the coils 11, 12, 13 are individually and separately wound around the poles 10a, 10b, 10c, the coil winding operation may be easily carried out as usual.

In this invention the Hall generators 3, 4 and the control circuit 2 are employed to detect the angular positions of the rotors 22, 23 and to rectify the current flowing through the coils 11, 12, 13. The Hall generators and the control circuit may be replaced by the brushes and commutators.

In reference to FIGS. 1 and 3, the Hall generator 3 is arranged between the pole 10a and the pole 10c of the armature 10, and the Hall generator 4 is arranged between the pole 10a and the pole 10b to detect the density of magnetic flux and the direction thereof when the magnetic flux penetrates the Hall generators 3, 4. The Hall generators 3, 4 are connected to each other in series so as to save the control current to be required to operate the Hall generators.

A regulator 30 has a positive electrode terminal 30a connected by a lead wire 31 to a resistor 32 which is in turn connected by a lead wire 33 to a terminal 3a of the Hall generator 3. The Hall generator 3 has another terminal 3b connected to a terminal 4a of the Hall generator 4 by a lead wire 34. The Hall generator has another terminal 4b grounded by a lead wire 35. The resistor 32 is employed to adjust the control current (bias current) flowing between the two terminals 3a, 3b of the Hall generator 3 and between the two terminals 4a, 4b of the Hall generator 4. The control current in this embodiment may be 5 milli ampere. The Hall generators 3, 4, however, have inner resistance easily influenced by a temperature, and accordingly the potential at the terminal 3a of the Hall generator 3 may be variable in dependence upon a temperature. The Hall generators 3, 4 have opened terminals 3c, 4c respectively. The Hall generator 3 has another terminal 3d having a potential which is a half of the potential at the terminal 3a when the Hall generator 3 receives no magnetic flux. The potential at the terminal 3a is, however, increased when the Hall generator 3 receives the magnetic flux in the direction N. On the other hand, the potential is decreased when the Hall generator 3 receives the magnetic flux in the direction S.

Resistors 36, 37, 38 are connected to each other in series by lead wires 40, 41 respectively. The resistor 36 has a terminal 36a connected by a lead wire 42 to a juncture D between the resistor 32 and the Hall generator 3 and thus connected to the terminal 3a of the Hall generator 3. The resistor 38 has a terminal 38a connected by a lead wire 43 to the terminal 3b of the Hall generator 3. In the same way, resistors 44, 45, 46 are connected to each other in series by lead wires 48, 49 respectively. The resistor 44 has a terminal 44a connected by a lead wire 47 to the terminal 4a of the Hall generator 4. The resistor 46 is connected by a lead wire 50 to the terminal 4b of the Hall generator 4. The resistors 36, 38 have the same resistance value, and the resistor 37 has a resistance value smaller than that of the resistors 36, 38. Similarly the resistors 44, 46 have the same resistance value, and the resistor 45 has a resistance value smaller than that of the resistors 44, 46.

A voltage comparator 5 is composed of two comparator devices in the form of operation amplifiers 51, 52 and is a so called window-type comparator. The operation amplifier 51 has a positive electrode terminal 51a, a negative electrode terminal 51b and an output terminal 51c, and is designed to produce an output when the input voltage at the positive input terminal 51a is higher than the input voltage at the negative input terminal 51b. Similarly the operational amplifier 52 has a positive electrode terminal 52a, a negative electrode terminal 52b and an output terminal 52c. The terminal 51a of the operation amplifier 51 is connected by a lead wire 53 to the terminal 52b of the operation amplifier 52. The terminals 51a, 52b have a common input terminal 5b of the comparator 5 connected by a lead wire 54 to the terminal 3d of the Hall generator 3. The terminal 51b of the operation amplifier 51 provides another input terminal 51c of the comparator 5 which is connected by a lead wire 56 to a juncture C between the resistor 36 and resistor 37. The terminal 52a of the operation amplifier 52 provides another input terminal 5a of the comparator 5 which is connected by a lead wire 55 to a juncture A between the resistor 37 and the resistor 38. The output terminal 51c of the operation amplifier 51 provides an output terminal 5d of the comparator 5, and the output terminal 52c of the operation amplifier 52 provides another output terminal 5e of the comparator 5. The resistors 36, 37, 38 are provided to divide the voltage appearing between the two terminals 3a, 3b of the Hall generator 3. The comparator 5 compares the potential at the junctures A and the potential B at the terminal 3d of the Hall generator 3, and the potential at the juncture C and the potential B, and then produces outputs at the output terminals 5d, 5e respectively.

When the Hall generator 3 receives no magnetic flux, the potential B at the terminal 3d is a half of the potential at the juncture D which is directly connected to the terminal 3a of the Hall generator 3, and as the resistors 36, 38 are so designed as to divide the voltage with the ratio of 1 : 1, the potential B will not exceed the potentials at the junctures A, C, and therefore the comparator 5 will produce no output. When the Hall generator 3 receives the magnetic flux of N polarity, the potential B will exceed the potential at the juncture C and then the comparator 5 will produce an output at the output terminal 5d. When the Hall generator 3 receives the magnetic flux of S polarity, the potential B will decreases to a level below the potential at the juncture A and then the comparator 5 will produce an output at the output terminal 5e.

The comparator 6 is composed of two operation amplifies 61, 62. The operation amplifier 61 has a positive electrode terminal 61a, a negative electrode terminal 61b and an output terminal 61c. The negative electrode terminal 61b is connected by a lead wire 65 to a juncture 48 between the two resistors 44, 45 and the positive electrode terminal 61a is connected by a lead wire 64 to the terminal 4d of the Hall generator 4. The operation amplifier 62 has a positive electrode terminal 62a, a negative electrode terminal 62b and an output terminal 62c. The negative electrode terminal 62b is connected to the lead wire 64 and the positive electrode terminal 62a is connected by a lead wire 66 to a juncture 49 between the two resistors 45, 46. The operation of the comparator 6 is the same as that of the comparator 5, and therefore the explanation thereof is omitted herein.

Figure 7:
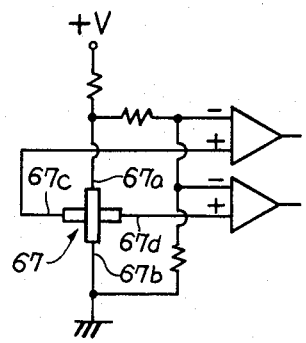
FIG. 7 is a prior art showing an electric circuit in which a Hall generator is connected to a set of comparators.
Figure 8:
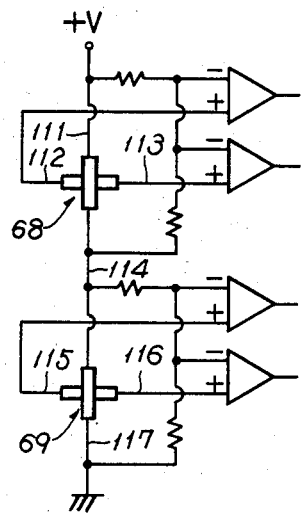
FIG. 8 is another prior art showing an electric circuit in which two Hall generators are employed in connection with two sets of Hall generators.

In reference to FIG. 7, it is generally known that the Hall generator 67 has four terminals 67a, 67b, 67c, 67d all connected to a comparator. Therefore in case two Hall generators 68, 69 are connected to each other in series as shown in FIG. 8, it is required to use seven lead wires 111, 112, 113, 114, 115, 116 and 117. In contrast in the embodiment of invention, the lead wires to be required are only five as indicated by 33, 34, 54 and 64. Thus the structure of the circuit is more simpler and the production cost may be reduced.

The logic circuit 7 is composed of a 3-input NOR gate 71 and another 3-input NOR gate 72. The NOR gate 71 has an input terminal 71a connected by a lead wire 73 to a lead wire 121 which is at one end connected to the output terminal 5d of the comparator 5, another input terminal 71b connected by a lead wire 74 to a lead wire 127 which is at one end connected to the output terminal 61c of the comparator 6, and another input terminal 71c connected by a lead wire 75 to a lead wire 133 which is at one end connected to an output terminal 72d of the NOR gate 72. The NOR gate 72 has an input terminal 72a connected by a lead wire 76 to a lead wire 122 which is at one end connected to the output terminal 5e of the comparator 5, another input terminal 72b connected by a lead wire 77 to a lead wire 128 which is at one end connected to the output terminal 62c of the comparator 6, and another input terminal 72c connected by a lead wire 78 to the input terminal 72b of the NOR of gate 72.

The NOR gate 71 has an output terminal 71d which is designed to produce an output of high potential when the input terminals 71a, 71b, 71c receive no input, but to produce no output when one of the input terminals 71a, 71b, 71c receives an input. Similarly the NOR gate 72 has an output terminal 72d which is designed to produce an output of high potential when the input terminals 72a, 72b, 73c receives no input, but to produce no output when one of the input terminals 72a, 72b, 72c receives an input.

Thus the logic circuit 7 is designed to obtain the position detecting signals at the output terminals 71d, 72d which are the same as the signals to be obtained at the two output terminals of a separate comparator which is to be required if one more Hall generator is provided between the two poles 10b, 10c of the armature 10. The lead wire 75 is provided to protect transistors 88, 89 which may be simultaneously conductive and damaged when the NOR gates 71, 72 have a high potential.

The 3-phase inverter circuit 8 is composed of a predetermined number of transistors 81, 82, 83, 84, 85, 86, 87, 88, 89 and a predetermined number of diodes 90A, 90B, 91A, 91B, 92A, 92B. The transistor 81 has the base 81b connected through a resistor 94 and the lead wire 121 to the output terminal 5d of the comparator 5, the collector 81c connected through a resistor 95 to the base 82b of the transistor 82, and the emitter 81e grounded. The transistor 83 has the base 83b connected through a resistor 96 and the lead wire 122 to the output terminal 5e of the comparator 5. Further the transistor 82 has the emitter 82e connected by lead wires 123, 124 to a power supply V and the collector 82c connected by a lead wire 125 to the collector 83c of the transistor 83. The diode 90A is connected between to collector 82c and the emitter 82e of the transistor 82, the diode being arranged in the normal direction to the emitter 82e. The diode 90B is connected between the emitter 83e and the collector 83e of the transistor 83, the diode being arranged in the normal direction to the collector 83c. The collectors 82c, 83c are connected by a lead wire 126 to a point P which is one of three points of the delta connections of the armature coils 11, 12, 13.

Similarly the transistor 84 has the base 84b connected through a resistor 97 and the lead wire 127 to the output terminal 61c of the comparator 6, the collector 84c connected through a resistor 98 to the base 85b of the transistor 85 and the emitter 84e grounded. The transistor 86 has the base 86b connected through a resistor 99 and the lead wire 128 to the output terminal 62c of the comparator 6. The transistor 85 has the emitter 85e connected by lead wires 129, 124 to the power supply V and the collector 85c connected by a lead wire 130 to the collector 86c of the transistor 86 which has the emitter 86e grounded. The diode 91A is connected between the collector 85c and the emitter 85e of the transistor 85, the diode being arranged in the normal direction to the emitter 85e. The diode 91B is connected between the emitter 86e and the collector 86c of the transistor, the diode being arranged in the normal direction to the collector 86c. The collectors 85c, 86c are connected by a lead wire 131 to a point Q which is one of three points of the delta connections of the armature coils 11, 12, 13.

The transistor 87 has the base 87b connected through a resistor 100 and a lead wire 132 to the output terminal 71d of the NOR gate 71d, the collector 87c connected through a resistor 101 to a base 88b of the transistor 88 and an emitter 87e grounded. The transistor 88 has the emitter 88e connected by the lead wire 124 to the power supply V and the collector 88c connected to the collector 89c of the transistor 89 which has the emitter 89e grounded. The diode 92A is connected between the collector 88c and the emitter 88e, the diode being arranged in the normal direction to the emitter 88e. The diode 92B is connected between the emitter 89e and the collector 89c of the transistor 89, the diode being arranged in the normal direction to the collector 89c. Thus the collector 89c and the emitter 89e are connected by a lead wire 135 to a point R, one of the delta connections of coils 11, 12, 13. The diodes 90A 90B, 91A, 91B, 92A, 92B are designed to flow in one direction the current due to the counter-electromotive force generated in the coils 11, 12, 13 during rotation of the rotor assembly 16.

Figure 6:
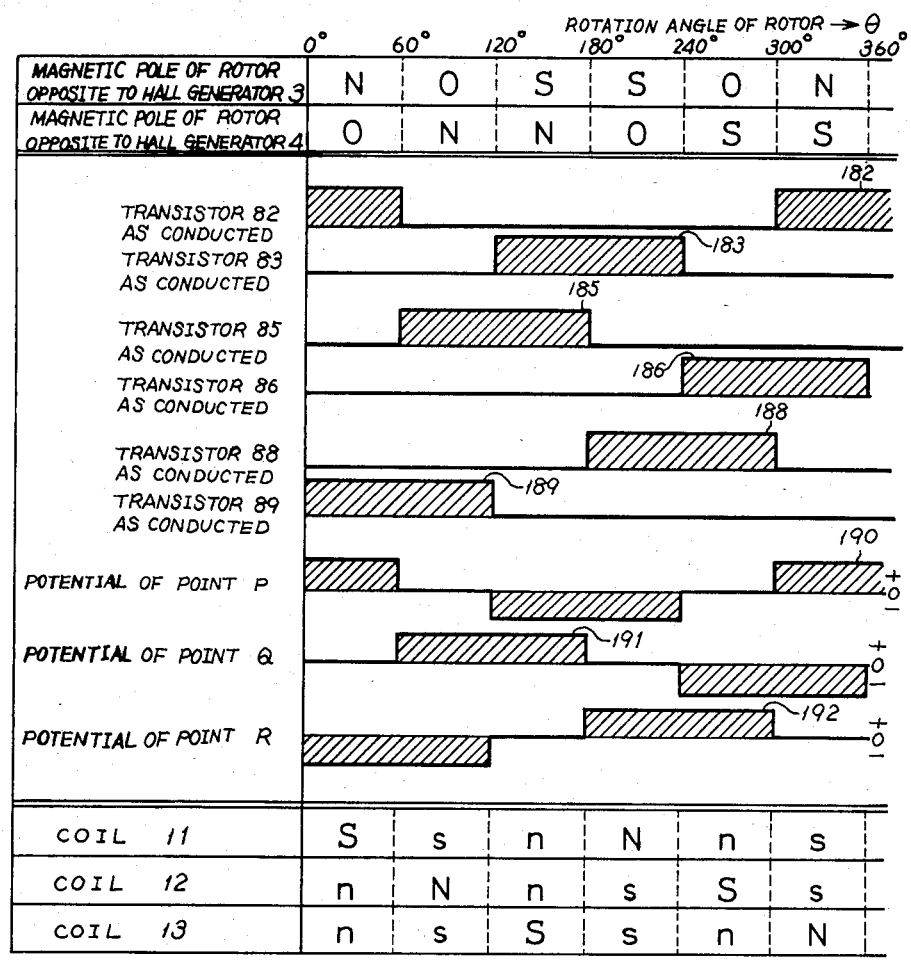
FIG. 6 is a table showing the relations between the rotation angles of the rotors and the wave forms of the control circuit.

In reference to FIG. 6 in which the rotation angles of rotor assembly 16 and the voltages at the individual parts of control circuit 2 are illustrated, the lateral axis $\theta$ represents the rotation angles of the rotor assembly 16, the reference numeral 182 denoted the conductive duration between the emitter 82e and the collector 82c of the transistor 82, the reference numeral 183 denotes the conductive duration of the transistor 83, and thus the reference numerals 185, 186, 188, 189 denote the conductive durations of the transistors 85, 86, 88, 89 respectively. Further the reference numeral 190 denotes the durations of positive and negative potentials at the connection point P of the armature coils 11, 12, 13, and thus the reference numerals 191, 192 denote the durations of positive and negative potentials of the connection points Q, R respectively of the armature coils 11, 12, 13. Still further the coil 11 presents the magnetic poles S, s, n, N, n, s of respectively predetermined durations at the pole 10a of the armature 10. The coil 12 presents the magnetic poles n, N, n, s, S, s of respectively predetermined durations at the pole 10b of the armature 10. The coil 13 presents the magnetic poles n, s, S, s, n, N of respectively predetermined durations at the pole 10c of the armature 10. In the durations of magnetic poles N, S, each of the coils 11, 12, 13 attracts the permanent magnet 14 or 15, but in the durations of magnetic poles n, s, each of the coils 11, 12, 13 repulses the permanent magnet 14 or 15 of the rotor assembly 16.

With the structure as mentioned above, the Hall motor 1 of the invention operates as follows: In reference to FIGS. 2, 3, 4 and 6, it is to be assumed that before the Hall motor 1 is rotated the permanent magnet 14 of N polarity is opposite to the Hall generator 3 and the portion 16a of no magnetic flux of the rotor assembly 16 is opposite to the Hall generator 4. When the control circuit 2 is supplied with power, the operation amplifier 51 of the comparator 5 produces an output of high potential at the output terminal 51c thereof, and the comparator 6 produces no output. The output of the comparator 5 is then applied through the lead wire 73 to the input terminal 71a of the NOR gate 71 of the logic circuit 7, and then the output terminal 71d of the NOR gate 71 has a zero potential. Since the NOR gate 72 receives no input at the input terminals 72a, 72b, the output terminal 72d produces an output of high potential. Thus when the operation amplifier 51 and the NOR gate 72 produce the output of high potential, the transistors 82, 89 become conductive, and the current flows from the power supply V to the coils 11, 12, 13 of the armature 10 all through the lead wires 124, 123, the transistor 82, the lead wire 126 and the connection point P and further flows to the ground all through the connection point R of the coils 11, 12, 13, the lead wire 135 and the transistor 89. In this case, the substantial amount of the current flows through the coil 11 as shown by an arrow X and a smaller amount of the current flows through the coils 12, 13 as shown by an arrow Y. Thus the coil 11 will mainly work and the coils 12, 13 will ancillarily work.

With the current flowing through the coil 11, the pole 10a of the armature 10 takes the S polarity and attracts the permanent magnet 14. With the current flowing through the coils 12, 13, the poles 10b, 10c of the armature 10 take the N polarity and repulse the permanent magnet 15. Then the rotor assembly 16 starts to rotate with the rotating shaft 18 in the counterclockwise direction in FIG. 3. With the rotation of the rotor assembly 16, the polarities of the rotor assembly 16 change as the rotor assembly passes by the Hall generators 3, 4 and the other combination of transistors 85, 89 become conductive and accordingly the flow of the current changes. Therefore, when the operation amplifiers 51, 61 and the NOR gate 71 produce the outputs, the transistors 82, 85, 88 become conductive and then the connection points P, Q, R of the coils 11, 12, 13 have a positive potential. When the operation amplifiers 52, 62 and the NOR gate 72 produce the outputs, the transistors 83, 86, 89 become conductive and then the connection point P, Q, R of the coils 11, 12, 13 have a negative potential. Thus the rotor assembly 16 continues to rotate.

According to the invention, the Hall generators 3, 4 are used to detect the three conditions of the rotor assembly 16 providing the S and N polarities and providing no magnetic flux respectively, and therefore no voltage rectifying circuits are additionally required. Moreover as the logic circuit 7 produces the signals indicating the angular positions of the rotor assembly 16 in dependence upon the position detecting signals generated by the two Hall generators 3, 4 just in the same way as if there were an additional Hall generator provided between the poles 10b and 10c of the armature 10, the Hall motor 1 of the 3-phase driving type may be operated with only the two Hall generators 3, 4.

It is generally known in the brush-type electric motor that the voltage may be rectified with the influence of residual electromotive force being reduced if the operations of the adjacent coils are overlapped more or less. The same effect may be obtained in the Hall motor by enlarging the angular region $\phi$ of the permanent magnets 14, 15 a little more than 120°.

The control circuit 2 of the invention has regulator 30 dividing the lead wire 31, which supplies the bias current to the Hall generators 3, 4, from the lead wire 124 which supplies the drive current to the coils 11, 12, 13, and therefore it is possible to vary the rating input voltage of the Hall motor 1 by changing the value of the resistor 32.

In this embodiment, as the coils 11, 12, 13 are of the bipolar type which may be energized at either of the positive and negative poles, the Hall motor will produce a high starting torque corresponding to the brush type 3-phase electric motor. According to the embodiment, the coils 11, 12, 13 are explained herein as in the delta connection. But the coils may be connected in the star connection.

Since the value of resistor 37 between the two input terminals 51b, 52a may be varied to change the operation of the comparator 5, the Hall generator 3 may be replaced by generators of various properties. Similarly the Hall generator 4 may be replaced by generators of various properties by changing the value of the resistor 45.

The Hall motor 1 of the invention is explained herein as a type of 3-phase driving system. It is however possible to modify the Hall motor 1 into a type of 5-phase driving system.

As to the mechanical rotation property of the Hall motor 1, it is to be noted that the rotor assembly 16 is composed of the pair of rotors 22, 23 which are arranged in symmetry pressed back to back against each other on the boss 25 around the rotating shaft 18, and are rotated by the respective armatures 10, 10. It is therefore easily understood that the output of the Hall motor 1 is twice as much as that of the motor having a single armature. Further compared with the motor having a single and cylindrically long rotor axially extending in one direction from the boss so as to obtain a sufficient output (though not shown), the Hall motor 1 of the invention is mechanically more balanced and free from vibration. Practically the Hall motor 1 of the invention will be driven at a high speed with stability up to approximately 10,000 r.p.m.. This is because the magnetic attraction and repulsion of each armature 10 as well as the magnetic force itself are completely balanced with respect to the symmetrically arranged rotors 22, 23.

Further, the respective armatures 10, 10 may be arranged on both sides of the fixedly connected walls 22a, 23a of the rotors 22, 23 in a manner that the poles 10a, 10b, 10c of one armature are angularly displaced by about 60° from those of the other armature so that the 3-phase electric motor may substantially have a specific rotational property such as of the 6-phase electric motor. Thus the variation of torque may be reduced and accordingly the rotor assembly 16 may be smoothly rotated.

Still further, the poles 10a, 10b, 10c of one armature may be properly displaced from those of other armature in the rotational direction of the rotor assembly 16 to thereby enable the armatures 10, 10 of the respective rotors 22, 23 to avoid to simultaneously pass by the electric positions, thus to reduce the electric shocks and accordingly to obtain a smooth rotation of the rotor assembly 16 with a constant torque.

Thus according to the invention, each of the two rotors has a pair of driving magnets having the N and S polarities respectively and oppositely arranged with the angular extension of about 120° or a little more, and two Hall generators are used to detect the angular positions of the rotor by discriminating the different individual conditions such as N polarity, S polarity and non-magnetic flux. These Hall generators cooperate with an additional simple gate circuit to drive a 3-phase Hall motor with a high torque which may be produced at a lower cost compared with the conventioal brush-type electric motors and may be used in combination with various types of instruments and devices with the accompanying advantages such as lower noise, reliability and durability which may greatly contribute to maintenance of the appliances in which the Hall motor is used. Further according to the invention, the rotor assembly is composed of two cylindrical rotors arranged in symmetry pressed against back to back with each other on the rotating shaft and around the respective armatures all for the purpose of maintaining the mechanical balance during rotation of the rotor assembly and also of increasing the balance of magnetic force acting between the armatures and the rotors. Further, by making the armature with twice the thickness, the output of the Hall motor may be remarkably increased and also by securing the mechanical balance, the vibration and noise of the Hall motor may be reduced. Thus the Hall motor of the invention may be driven at a high speed up to approximately 10,000 r.p.m. Further according to the invention, a pair of armatures are provided with three poles respectively and are arranged on both sides of the connected bottom walls of the rotors in such a manner that the poles of one armature are angularly displaced approximately 60° from those of the other armature, so that the 3-phase electric motor may substantially have a specific rotational property such as of the 6-phase electric motor. Further according to the invention, the poles of one armature are arranged as angularly displaced from those of the other armature so that the times may be changed when the respective armatures pass by the electric position, thus to prevent the abrupt variation of torque and to moderate the resultant shock and accordingly to obtain a smooth rotation of the motor. Still further according to the invention, the poles of one armature are arranged angularly displaced from those of the other armature so that the specific rotational property such as to be actually obtained when the center angles of the poles are enlarged while maintaining the condition in which the coils may be easily wound as usual around the individual poles radially extended from the armatures.

The invention being thus described, it will be obvious that the invention may be modified in many ways. Such modifications and variations will not be regarded as a departure from the spirit and scope of the invention, and all such modifications and variations are intended to be included within the scope of the following claims.

What is claimed is:

1. An electric motor having Hall generators and a control circuit comprising:

rotor means including a rotor having an inner periphery, a pair of permanent magents of different polarities secured to said inner periphery of said rotor, said pair of permanent magents being opposite to each other and angularly extending in a limited arc along said inner periphery of said rotor to produce mangetic fluxes of different polarities, said rotor having a pair of unmagnetized portions producing no magnetic flux angularly extending over a limited arc along said inner periphery between said pair of permanent magnets and being opposite to each other;

armature means including an armature having three poles and a coil wound around each of said poles, said coils being connected to each other;

Hall generator means including a pair of Hall generators angularly spaced from each other with respect to the axis of rotation of said rotor, said Hall generators being responsive to a first one of said permanent magnets to produce a first electric signal and being responsive to a second one of said permanent magnets to produce a second electric signal, said Hall generators being responsive to said unmagnetized portions of said rotor to produce no electric signal; and control circuit means including a control circuit having two pairs of comparator devices, a first pair of comparator devices being electrically connected to one of said Hall generators, a first one of said first pair of comparator devices being responsive to said first electric signal produced by said one of said Hall generators to produce a first electric output, and a second one of said first pair of comparator devices being responsive to said second electric signal produced by said one of said Hall generators to produce a second electric output, said first and second ones of said first pair of comparator devices being responsive to an absence of an electric signal from said one of said Hall generators to produce no electric output, a second pair of comparator devices being electrically connected to the other of said Hall generators, a first one of said second pair of comparator devices being responsive to said first electric signal produced by said other of said Hall generators to produce a first electric output, and a second one of said second pair of comparator devices being responsive to said second electric signal produced by said other of said Hall generators to produce a second electric output, said first and second ones of said second pair of comparator devices being responsive to an absence of an electric signal from said other of said Hall generators to produce no electric output, said control circuit means further including a logic circuit having a pair of gates each having three inputs selectively connected to said outputs of said first and second pairs of comparator devices, each of said gates producing an electric output when said three inputs receive no electric output from said first and second pairs of comparator devices to which said three inputs are selectively connected, each of said gates producing no electric signal when one of said three inputs receives an electric output from said first and second pairs of comparator devices to which said three inputs are selectively connected, said electric outputs of said first and second pairs of comparator devices and of said pair of gates being connected to said coils of said three-pole armature and cooperating to control an electric current flowing through said coils in order to continuously rotate said rotor means.

2. The electric motor as defined in claim 1, wherein said Hall geneators are spaced from one another by an angle of approximately 120°.

3. The electric motor as defined in claim 1, wherein each of said permanent magnets extends over an arc of approximately 120°.

4. The electric motor as defined in claim 1, wherein each of said unmagnetized portions extends over an arc of approximately 60° between said pair of permanent magnets.

5. The electric motor as defined in claim 1, wherein each of said rotor means includes a pair of cylindrical rotors having a common rotor shaft, each of said cylindrical rotors having a bottom provided at one end and being open at the opposite end, said cylindrical rotors being fixedly connected to one another at said bottoms and to said common rotor shaft, each of said cylindrical rotors having an inner periphery, a pair of permanent magnets of different polarities secured to each of said inner peripheries, one of the permanent magnets of each said pair being opposite to the other permanent magnet of the same pair, said permanent magnets angularly extending in limited arcs along said inner periphery of their associated rotors to produce magentic fluxes of different polarities, wherein said armature means includes a pair of armatures each comprising three poles having coils wound therearound, said armatures being arranged axially of said common rotor shaft, one of said armatures being within one of said cylindrical rotors and the other of said armatures being within the other of said cylindrical rotors, said coils being connected to each other.

6. The electric motor as defined in claim 5, wherein each of said rotors has a pair of unmagnetized portions opposite to each other and each angularly extending in a limited arc along the inner periphery of the associated rotor between said pair of permanent magnets.

7. The electric motor as defined in claim 6, wherein each of said unmagnetized portions extend over an arc of approximately 60°.

8. The electric motor as defined in claim 7, wherein the three poles of each of said armatures are angularly displaced with respect to the axis of rotation of said rotors by about 60° from the three poles of the other of said armatures.

9. The electric motor as defined in claim 5, wherein each of said permanent magnets extends over an arc of approximately 120°.

10. The electric motor as defined in claim 5, wherein said three poles of each of said aramtures are angularly spaced by about 120° from each other.

* * * * *